US009829404B2

(12) United States Patent
Yamada et al.

(10) Patent No.: US 9,829,404 B2
(45) Date of Patent: Nov. 28, 2017

(54) PRESSURE SENSOR

(71) Applicant: NGK SPARK PLUG CO., LTD., Nagoya-shi, Aichi (JP)

(72) Inventors: Tatsunori Yamada, Seto (JP); Junki Iwabuchi, Komaki (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 119 days.

(21) Appl. No.: 15/092,253

(22) Filed: Apr. 6, 2016

(65) Prior Publication Data

US 2016/0299024 A1    Oct. 13, 2016

(30) Foreign Application Priority Data

Apr. 13, 2015 (JP) ................................. 2015-081527

(51) Int. Cl.
*G01L 1/16* (2006.01)
*G01L 7/02* (2006.01)
*G01L 7/08* (2006.01)
*G01L 9/08* (2006.01)
*G01L 19/14* (2006.01)
(Continued)

(52) U.S. Cl.
CPC ............ *G01L 7/082* (2013.01); *G01L 19/145* (2013.01); *F23Q 2007/005* (2013.01); *G01M 15/08* (2013.01)

(58) Field of Classification Search
CPC ..... G01L 1/00; G01L 1/16; G01L 7/00; G01L 7/02; G01L 7/08; G01L 7/082; G01L 7/16; G01L 9/08; G01L 19/00; G01L 19/14; G01L 19/145; G01M 15/08; F23Q 2007/005

See application file for complete search history.

(56) References Cited

U.S. PATENT DOCUMENTS 4,982,608 A    1/1991   Marki et al.
2007/0163355 A1   7/2007   Nassar et al.
(Continued)

FOREIGN PATENT DOCUMENTS

EP    2730904 A1    5/2014
GB    1243546 A     8/1971
(Continued)

OTHER PUBLICATIONS

European Patent Office, Extended European Search Report issued in corresponding European Patent Application No. 16164935, dated Sep. 8, 2016.

*Primary Examiner* — Nguyen Ha
*Assistant Examiner* — Wyn Ha
(74) *Attorney, Agent, or Firm* — Stites & Harbison, PLLC; Jeffrey A. Haeberlin; James R. Hayne

(57) ABSTRACT

A pressure sensor includes a tubular housing; a diaphragm which is joined to one end portion of the housing through a fusion zone; and a sensor element which is disposed in the housing and to which pressure received by the diaphragm is transmitted. As viewed in a section which contains the center axis of the housing, a pair of the fusion zones exist, and each of the fusion zones is formed in such an inclined manner that its distance from the center axis increases as it extends from the outer surface of the diaphragm toward the other-end-portion side of the housing.

3 Claims, 9 Drawing Sheets

(51) Int. Cl.
*G01M 15/08* (2006.01)
*F23Q 7/00* (2006.01)

(56) References Cited

U.S. PATENT DOCUMENTS

| | | | |
|---|---|---|---|
| 2013/0068029 A1* | 3/2013 | Romo | G01L 13/026 |
| | | | 73/706 |
| 2013/0319094 A1 | 12/2013 | Nakamura et al. | |
| 2014/0130585 A1 | 5/2014 | Borgers et al. | |
| 2015/0048066 A1* | 2/2015 | Maeda | F23Q 7/001 |
| | | | 219/121.64 |

FOREIGN PATENT DOCUMENTS

| JP | S48-39753 B1 | 11/1973 |
|---|---|---|
| JP | H06-207875 A | 7/1994 |

\* cited by examiner

PRESSURE SENSOR

CROSS REFERENCE TO RELATED APPLICATION

The present application claims priority to Japanese Patent Application No. 2015-081527, which was filed on Apr. 13, 2015, the disclosure of which is herein incorporated by reference in its entirety.

BACKGROUND OF THE INVENTION

Field of the Invention
The present invention relates to a pressure sensor.
Description of Related Art
A conventionally known pressure sensor includes a tubular housing, a diaphragm which is deformed in response to pressure received and is joined to one end portion of the housing, and a sensor element which is disposed in the housing and to which the amount of deformation of the diaphragm is transmitted (refer to, for example, Patent Document 1). Such a pressure sensor is used for detecting pressure in a combustion chamber of an internal combustion engine, for example, by exposure of the diaphragm provided at the one end portion to the combustion chamber.

RELATED ART DOCUMENTS

Patent Document 1 is Japanese Patent Application Laid-Open (kokai) No. H06-207875.
Patent Document 2 is Japanese Patent Publication (kokoku) No. S48-39753.
Patent Document 3 is U.S. Pat. No. 4,982,608.

BRIEF SUMMARY OF THE INVENTION

However, long-term use of a pressure sensor may possibly be accompanied by gradual damage to a joint between the housing and the diaphragm due to thermal history or the like of the pressure sensor. If the joint between the housing and the diaphragm is damaged, some components of the pressure sensor may possibly be detached and drop into a space (e.g., a cylinder) whose pressure is to be detected. Such detachment causes a problem in an object apparatus of pressure detection (internal combustion engine), and is thus undesirable. Conventionally, sufficient study has not been conducted on implementation of an appropriate structure of a joint between the housing and the diaphragm in consideration of damage caused by the above-mentioned thermal history or the like.

The present invention has been conceived to solve the above problem and can be embodied in the following modes.

(1) A mode of the present invention provides a pressure sensor comprising a tubular housing having a forward portion and a rear side; a diaphragm joined to one end portion (i.e., a forward portion) of the housing through a fusion zone; and a sensor element disposed in the housing and to which pressure received by the diaphragm is transmitted. In the pressure sensor, as viewed in a section which contains a center axis of the housing, the fusion zone has a pair of cross-sectional portions (i.e., a pair of the fusion zones exist). Each of the cross-sectional portions are formed in an inclined manner such that a distance from the center axis to a respective cross-sectional portion increases as the cross-sectional portions extends from an outer surface of the diaphragm toward the rear side (i.e., the other-end-portion side) of the housing.

According to the pressure sensor of this mode, even when a crack is generated in the perimeter of the fusion zone in the course of repeated use of the pressure sensor due to thermal history or the like, there can be restrained detachment of component members, including the diaphragm, of the pressure sensor. As a result, even though the pressure sensor is damaged, propagation of damage to an object equipment of pressure measurement can be restrained.

(2) The pressure sensor of the above-mentioned mode may be such that as viewed in the section which contains the center axis of the housing, for each of the pair of cross-sectional portions a first angle (i.e., an angle θ1) is defined between the center axis of the housing and a straight line which passes through a first end point A of the cross-sectional portion located nearest to the rear side (i.e., the other-end-portion side) and through an end point B of the cross-sectional portion located farthest from the center axis of the housing on an end surface of the pressure sensor on a forward size (i.e., the one-end-portion side) of the housing, the first angle being 0.5 degrees or more.

According to the pressure sensor of this mode, there can be enhanced the effect of restraining detachment of the members including the diaphragm upon generation of a crack in the perimeter of the fusion zone.

(3) The pressure sensor of the above-mentioned mode may be configured as follows: the housing has a diameter-expanding portion formed at the forward portion (i.e., the one end portion), the diameter-expanding portion having a diameter that expands as the housing extends toward the rear side from the forward portion and the diameter-expanding portion configured for airtight contact with an object to which the pressure sensor is to be attached (hereinafter called an "object body for attachment"), and, as viewed in the section which contains the center axis of the housing, a second angle is defined between the center axis of the housing and a straight line extending along a surface of the diameter-expanding portion, the second angle larger than the first angle.

According to the pressure sensor of this mode, there can be restrained the distortion of the surface of the diameter-expanding portion caused by heat in the course of formation of the fusion zone; thus, there can be restrained damage to a seal between the pressure sensor and an object body for attachment caused by the distortion. Also, even though the fusion zone is provided deeper, since the distance between the fusion zone and the surface of the diameter-expanding portion can be secured, welding strength can be enhanced.

The present invention can be embodied in various modes other than the above. For example, the present invention can be embodied in a method of manufacturing a pressure sensor or a method of welding a diaphragm of the pressure sensor.

DETAILED DESCRIPTION OF EXEMPLARY EMBODIMENTS OF THE INVENTION

A. First Embodiment

Figure 1:
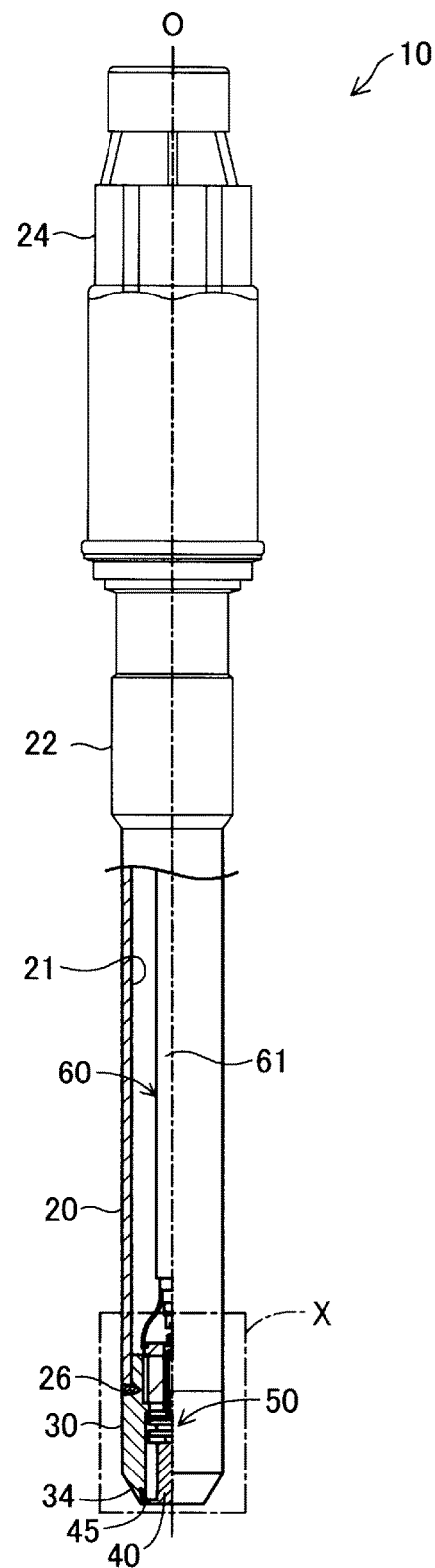
FIG. 1 is an explanatory view showing a schematic configuration of a pressure sensor.

FIG. 1 is an explanatory view showing a pressure sensor 10 according to a first embodiment of the present invention. The pressure sensor 10 of the present embodiment is attached to an internal combustion engine and is used for detecting pressure in a combustion chamber of the internal combustion engine. As shown in FIG. 1, the pressure sensor 10 includes, as main components, a tubular first metal member 20, a second metal member 30, a pressure receiver 40, an element assembly 50, and a cable 60. In this specification, as viewed along a center axis O of the pressure sensor 10, a side toward the second metal member 30 is called the "forward side," and a side toward the first metal member 20 is called the "rear side."

FIG. 1 shows an external view of a rear portion of the pressure sensor 10, and an external view of a forward portion of the pressure sensor 10 on the right side of the center axis O. Also, FIG. 1 shows the sectional structure of the forward portion of the pressure sensor 10 on the left side of the center axis O. In the present embodiment, the center axis O of the pressure sensor 10 is also the center axis of the first metal member 20, the second metal member 30, the pressure receiver 40, and the element assembly 50.

The first metal member 20 and the second metal member 30 have tubular shapes whose sections (hereinafter also called cross sections) perpendicular to the center axis O are annular and which extend along the center axis O. In the present embodiment, the first metal member 20 and the second metal member 30 are formed of stainless steel, but may be formed of other steels such as low-carbon steel.

The first metal member 20 has an axial hole 21, which is a through hole whose axis is the center axis O. The first metal member 20 also has a threaded portion 22 and a tool engagement portion 24 provided on the outer circumferential surface of a rear portion thereof. The threaded portion 22 has a thread groove for fixing the pressure sensor 10 to the cylinder head of an internal combustion engine. The tool engagement portion 24 has a periphery shape (e.g., hexagonal cross section) for allowing a tool (not shown) to be engaged therewith for attaching and detaching the pressure sensor 10.

Figure 2:
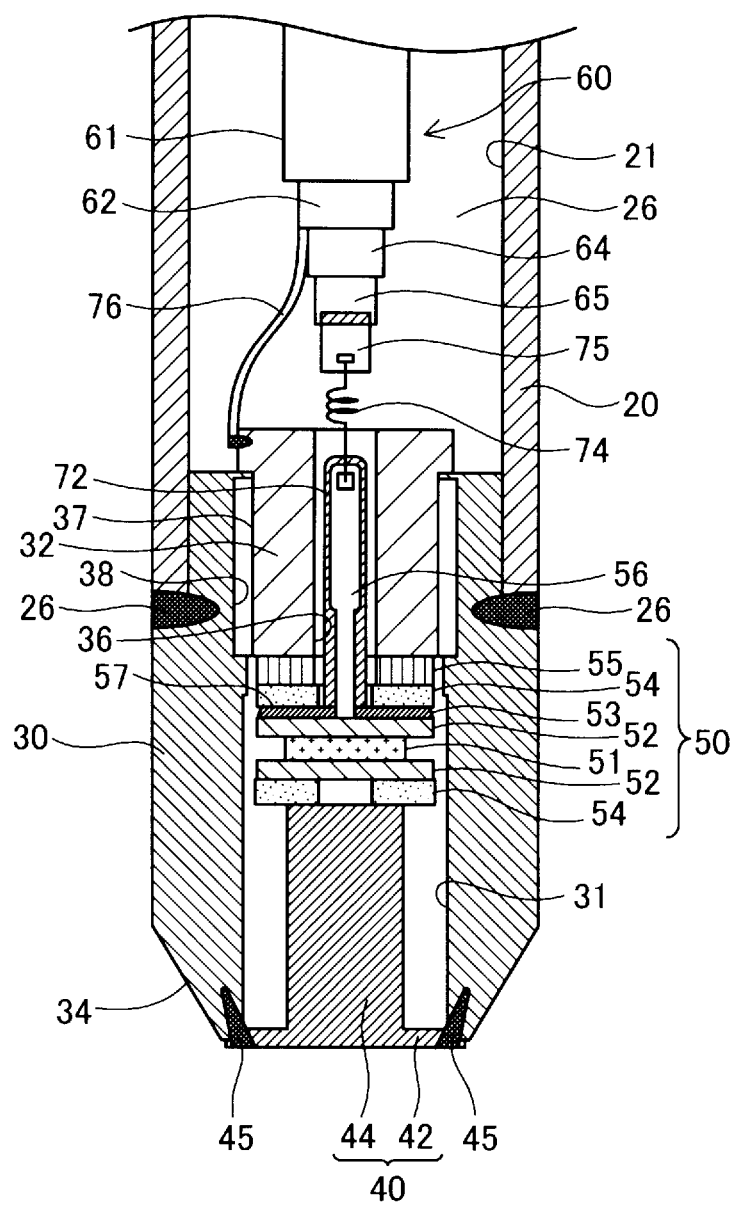
FIG. 2 is a sectional view showing, in an enlarged scale, the structure of a forward end portion of the pressure sensor.

FIG. 2 is a sectional view showing, in an enlarged scale, a forward end portion of the pressure sensor 10 appearing in a region X of FIG. 1. The second metal member 30 is disposed on the forward side of the first metal member 20 and is joined to the forward end of the first metal member 20 through a fusion zone 26. The second metal member 30 has a diameter-expanding portion 34 which is formed at a forward end portion thereof and whose diameter expands toward the rear side from the forward end thereof. In attaching the pressure sensor to the internal combustion engine, the pressure sensor 10 comes into airtight contact with the cylinder head of the internal combustion engine at the diameter-expanding portion 34. Also, the second metal member 30 has an axial hole 31, which is a through hole whose axis is the center axis O. Within the axial hole 31, the pressure receiver 40, the element assembly 50, and a pressing screw 32 are disposed sequentially from the forward side toward the rear side.

The pressure receiver 40 includes a diaphragm 42 and a rod 44. The diaphragm 42 is an approximately circular membrane and is welded to the second metal member 30 at the forward end of the second metal member 30 in such a manner as to close the axial hole 31. The pressure sensor 10 of the present embodiment is characterized by the form of a fusion zone 45 formed as a result of welding the diaphragm 42 and the second metal member 30. The fusion zone 45 will be described in detail herein later.

The diaphragm 42 is located at the forward end of the pressure sensor 10 and is exposed within a combustion chamber of the internal combustion engine to form a pressure-receiving plane, and is deformed in response to pressure in the combustion chamber. The rod 44 is a circular columnar member extending along the center axis O; is connected to the diaphragm 42 at its forward end surface; and is displaced in response to deformation of the diaphragm 42 to convert pressure received by the diaphragm into load and to transmit the load to the element assembly 50 located on the rear side thereof. The thinner the diaphragm 42, the more likely the deformation of the diaphragm 42, whereby the sensitivity of the pressure sensor 10 can be enhanced. Also, the greater the diameter of the rod 44, the more likely the rearward transmission of pressure received by the diaphragm 42, whereby the sensitivity of the pressure sensor 10 can be enhanced. In the present embodiment, the diaphragm 42 and the rod 44 are formed of stainless steel, but may be formed of different metals. The diaphragm 42 and the rod 44 may be formed integral with each other by carving or forging, or may be formed separately from each other, followed by integration by welding or the like.

The element assembly 50 is composed of one piezoelectric element 51, one electrode plate 53, one insulation plate 55, two first packings 52, and two second packings 54. As shown in FIG. 2, in the element assembly 50, the second packing 54, the first packing 52, the piezoelectric element 51, the first packing 52, the electrode plate 53, the second packing 54, and the insulation plate 55 are stacked sequentially from the forward side toward the rear side.

Figure 3A:
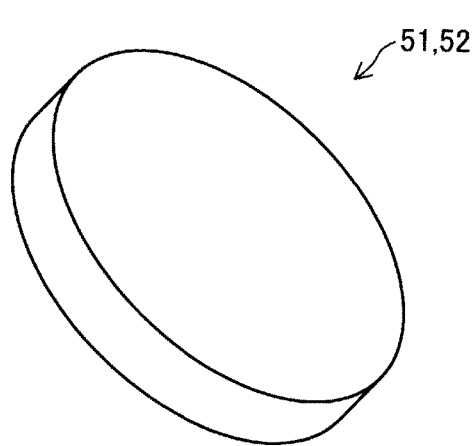
FIG. 3(A), FIG. 3(B), and FIG. 3(C) are perspective views showing external views of component members of an element assembly.
Figure 3B:
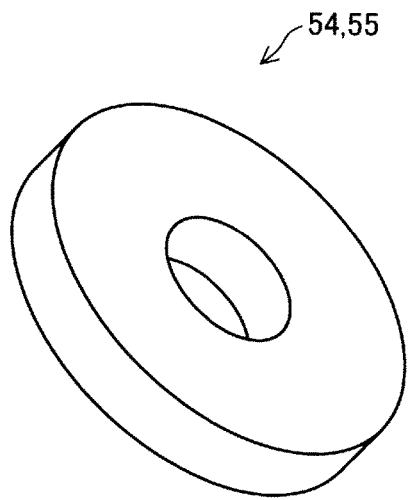
Figure 3C:
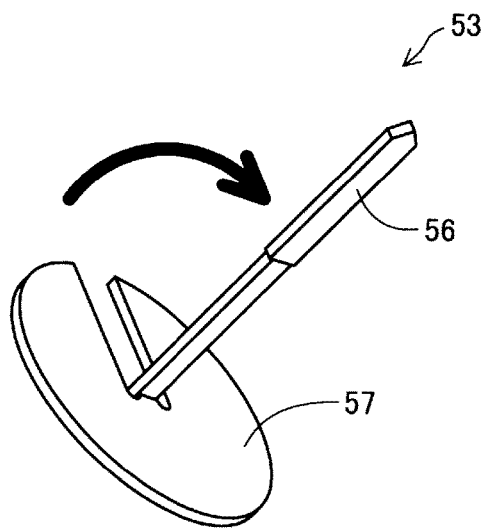

FIGS. 3(A) through 3(C) are perspective views showing external views of component members of the element assembly 50. As shown in FIG. 3(A), the piezoelectric element 51 and the first packing 52 are disk-like members. Also, as shown in FIG. 3(B), the second packing 54 and the insulation plate 55 are annular members. The piezoelectric element 51 is formed of crystal or the like in the present embodiment, but may be formed of other types of materials. The piezoelectric element 51 converts load transmitted from the pressure receiver 40 into an electric charge and outputs a signal (voltage signal) in response to the amount of deformation of the diaphragm 42. The first packing 52 and the second packing 54 are formed of stainless steel in the present embodiment, but may be formed of other types of metals. The first packing 52 is adapted to transmit an electric charge generated by the piezoelectric element 51. The insulation plate 55 provides insulation between the electrode plate 53 and the pressing screw 32. The insulation plate 55 is formed of alumina in the present embodiment, but may be formed of other types of insulating materials.

As shown in FIG. 3(C), the electrode plate 53 includes a disk portion 57, which is an approximately disk-like member, and a terminal portion 56 extending perpendicularly from the approximately circular surface of the disk portion 57. The electrode plate 53 is formed of stainless steel in the present embodiment, but may be formed of other types of metals. The electrode plate 53 can be formed as follows: an integral blank of the disk portion 57 and the terminal portion 56 is blanked from a flat plate of stainless steel; then, a portion corresponding to the terminal portion 56 is bent.

Referring back to FIG. 2, the pressing screw 32 is adapted to apply preload to the element assembly 50. The pressing screw 32 is formed of stainless steel in the present embodiment, but may be formed of other types of metals. The pressing screw 32 has an external thread portion 37 formed on its outer surface. The second metal member 30 has an internal thread portion 38 which corresponds to the external thread portion 37 and is formed on the wall surface of the axial hole 31 thereof in the vicinity of the rear end thereof. Also, the pressing screw 32 has an axial hole 36, which is a through hole whose axis is the center axis O.

The electrode plate 53 is disposed in the axial hole 31 of the second metal member 30 in such a manner that the disk portion 57 is in surface contact with the first packing 52, while the terminal portion 56 extends rearward. At this time, the terminal portion 56 extends through the central holes formed in the second packing 54 and the insulation plate 55 so as not to come into contact with the second packing 54 disposed rearward of the electrode plate 53. Also, the terminal portion 56 extends through the axial hole 36 of the pressing screw 32 apart from the wall surface of the axial hole 36. Furthermore, the component members of the element assembly 50 are disposed within the axial hole 31 of the second metal member 30 apart from the inner wall surface of the second metal member 30. By virtue of this, the terminal portion 56 of the electrode plate 53 transmits an electric charge rearward from the rear end surface of the piezoelectric element 51 without involvement of short circuit. In order to uniformly apply load to the piezoelectric element 51, the element assembly 50 has the second packing 54 disposed not only on the rear side of the piezoelectric element 51 but also on the forward side of the piezoelectric element 51.

In the present embodiment, the second metal member 30 corresponds to the "housing" in the section "Means for Solving the Problem." Also, the piezoelectric element 51 corresponds to the "sensor element" in the section "Means for Solving the Problem." Furthermore, the forward side as viewed along the center axis O corresponds to the "one-end-portion side" in the section "Means for Solving the Problem," and the rear side corresponds to the "other-end-portion side" in the section "Means for Solving the Problem."

As shown in FIG. 2, a cable 60 is disposed in the axial hole 21 of the first metal member 20. As will be described herein later, the cable 60 is connected to the terminal portion 56 of the electrode plate 53 through a small-diameter conductor 74 and through a flat conductor 75. The cable 60 is adapted to transmit an electric charge of the piezoelectric element 51 to an unillustrated integrated circuit which detects a combustion pressure of the internal combustion engine on the basis of the electric charge of the piezoelectric element 51. FIG. 2 shows an external view, rather than a section, of the cable 60.

Figure 4A:
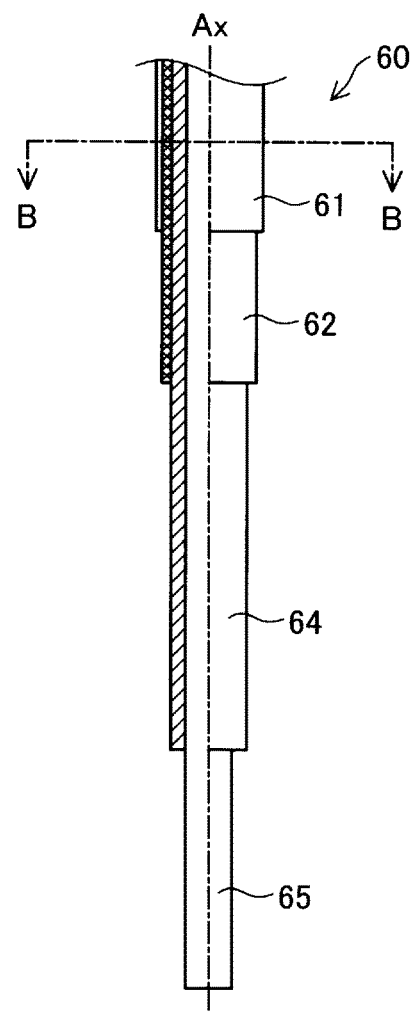
FIG. 4(A) and FIG. 4(B) are explanatory views showing the structure of a cable to be connected to a terminal portion of an electrode plate.
Figure 4B:
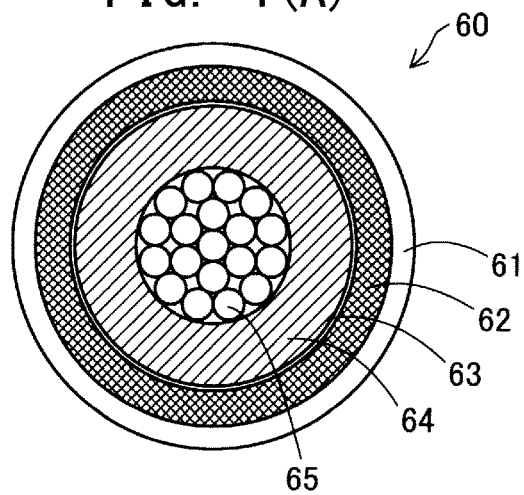

FIGS. 4(A) and 4(B) are explanatory views showing the structure of the cable 60. In the present embodiment, the cable 60 is a so-called shield cable having a multilayer structure, thereby reducing noise. FIG. 4(A) shows an external structure of the cable 60 on the right side of the center axis Ax, and the sectional structure of the cable 60 on the left side of the center axis Ax. FIG. 4(B) shows a B—B section of FIG. 4(A). The cable 60 has the following structure: an inner conductor 65 composed of a plurality of conductors is disposed in a central region; an insulator 64 surrounds the inner conductor 65 from radially outside; an electrically conductive coating 63 is provided on the outer circumferential surface of the insulator 64; an outer conductor 62, which is a mesh shield, is provided radially outward of the coating 63; and the outer surface of the outer conductor 62 is covered with a jacket 61.

As shown in FIG. 4(A), a forward end portion of the cable 60 has the following constitution: the outer conductor 62 not covered with the jacket 61 is exposed and extends forward from a portion of the cable 60 covered with the jacket 61; the insulator 64 not covered with the outer conductor 62 is exposed and extends forward from a portion of the cable 60 of the exposed outer conductor 62; and the inner conductor 65 not covered with the insulator 64 is exposed and extends forward from a portion of the cable 60 of the exposed insulator 64.

As shown in FIG. 2, the inner conductor 65 exposed at the forward end of the cable 60 is connected to the terminal portion 56 through the small-diameter conductor 74 and the flat conductor 75. Specifically, the flat conductor 75 is welded to the forward end of the inner conductor 65; the rear end of the coiled small-diameter conductor 74 is welded to the forward end of the flat conductor 75; and the forward end of the small-diameter conductor 74 is welded to a rear end portion of the terminal portion 56. The flat conductor 75 is narrower than the inner conductor 65 and wider than the small-diameter conductor 74. Also, the flat conductor 75 is smaller in volume than the inner conductor 65 and is greater in volume than the small-diameter conductor 74. Thus, an electric charge of the piezoelectric element 51 can be transmitted to the inner conductor 65 through the terminal portion 56.

Notably, a heat-shrinkable tube 72 covers the entire terminal portion 56 ranging from the forward end to the rear end located rearward of a weld between the terminal portion 56 and the small-diameter conductor 74, as well as a forward end portion of the small-diameter conductor 74. This enhances reliability in electrical insulation between the terminal portion 56 and the pressing screw 32. In manufacture of the pressure sensor 10, a step of welding the small-diameter conductor 74 and the electrode plate 53 having the above-mentioned terminal portion 56 and a step of covering with the heat-shrinkable tube 72 may be performed prior to overall assembly.

Also, as shown in FIG. 2, the cable 60 has a stranded wire formed continuously from the outer conductor 62 and extending forward from the outer conductor 62, and the stranded wire serves as a grounding wire 76. A forward end portion of the grounding conductor 76 is welded to a rear end portion of the pressing screw 32. Accordingly, the outer conductor 62 is grounded through a grounding conductor 76, the pressing screw 32, the second metal member 30, and the cylinder head of the internal combustion engine.

Figure 5:
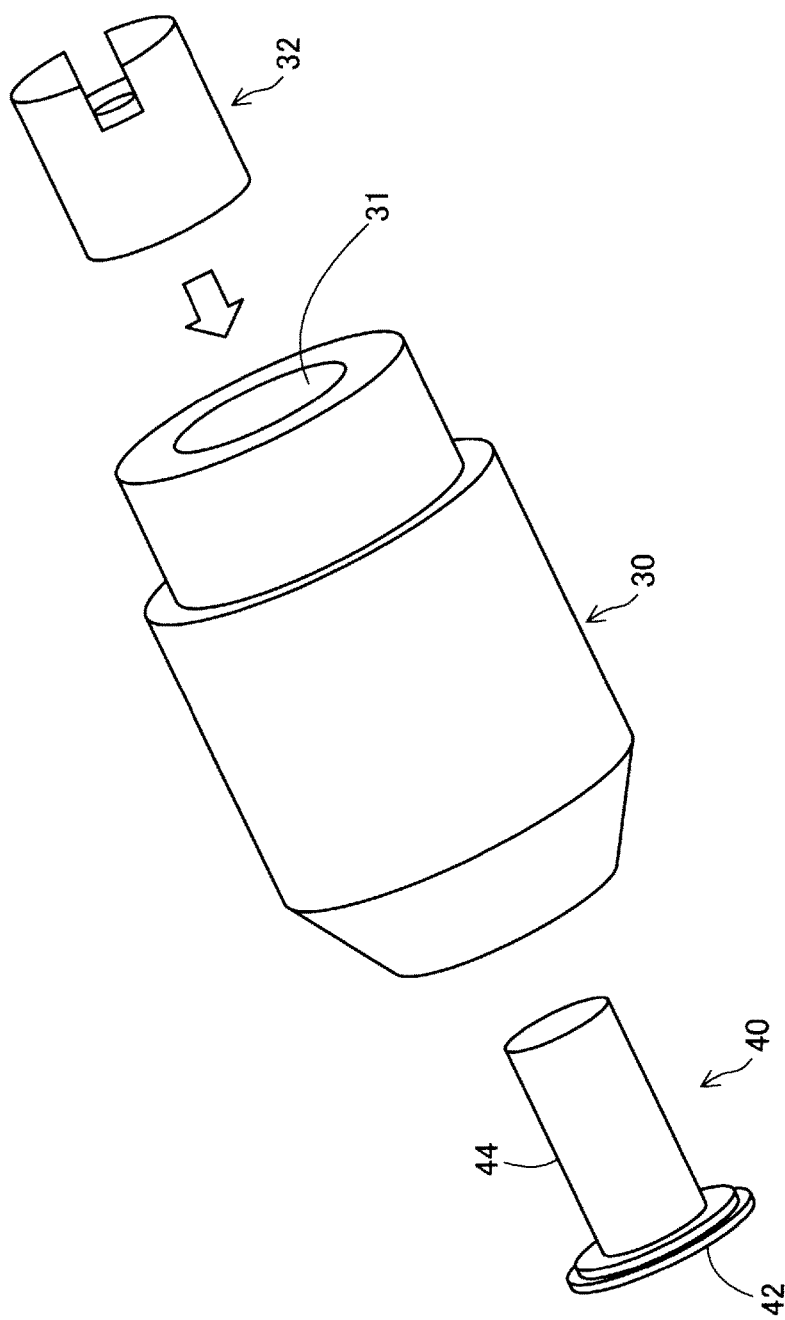
FIG. 5 is an explanatory view showing a second metal member, a pressure receiver, and a pressing screw as viewed before assembly.

FIG. 5 is an explanatory view showing the second metal member 30, the pressure receiver 40, and the pressing screw 32 as viewed before assembly. In manufacture of the pressure sensor 10, the rod 44 is inserted into the axial hole 31 of the second metal member 30 from the forward side; then, the diaphragm 42 and the second metal member 30 are welded to thereby form the fusion zone 45 (see FIG. 2).

Subsequently, the element assembly 50 is placed into the axial hole 31 from the rear side of the second metal member 30. At this time, as mentioned previously, the electrode plate 53 of the element assembly 50 may be united beforehand with the small-diameter conductor 74 and the heat-shrinkable tube 72. Subsequently, the small-diameter conductor 74 is inserted into the axial hole 36 of the pressing screw 32 from the forward side. In a state in which the small-diameter conductor 74 extends rearward from the axial hole 36 of the pressing screw 32, the external thread portion 37 of the pressing screw 32 is threadingly engaged with the internal thread portion 38 formed on the wall surface of the axial hole 31 of the second metal member 30 to apply preload to the element assembly 50 (see FIG. 2).

Then, the rear end of the small-diameter conductor 74 extending rearward from the pressing screw 32 and the forward end of the inner conductor 65 are welded to the flat conductor 75. Also, a forward end portion of the grounding conductor 76 and a rear end portion of the pressing screw 32 are welded. Furthermore, the cable 60 is passed through the axial hole 21 of the first metal member 20 (not shown), and the forward end of the first metal member 20 and the rear end of the second metal member 30 are welded to thereby form the fusion zone 26 (see FIGS. 1 and 2). Subsequently, molten rubber is charged into the axial hole 21 of the first metal member 20 to fill the axial hole 21 with a rubber layer (not shown), thereby completing the pressure sensor 10. Forming the rubber layer improves waterproofness in the pressure sensor 10 and enhances vibration resistance. In place of molten rubber, molten resin may be charged into the axial hole 21.

B. Constitution of Fusion Zone

Figure 6:
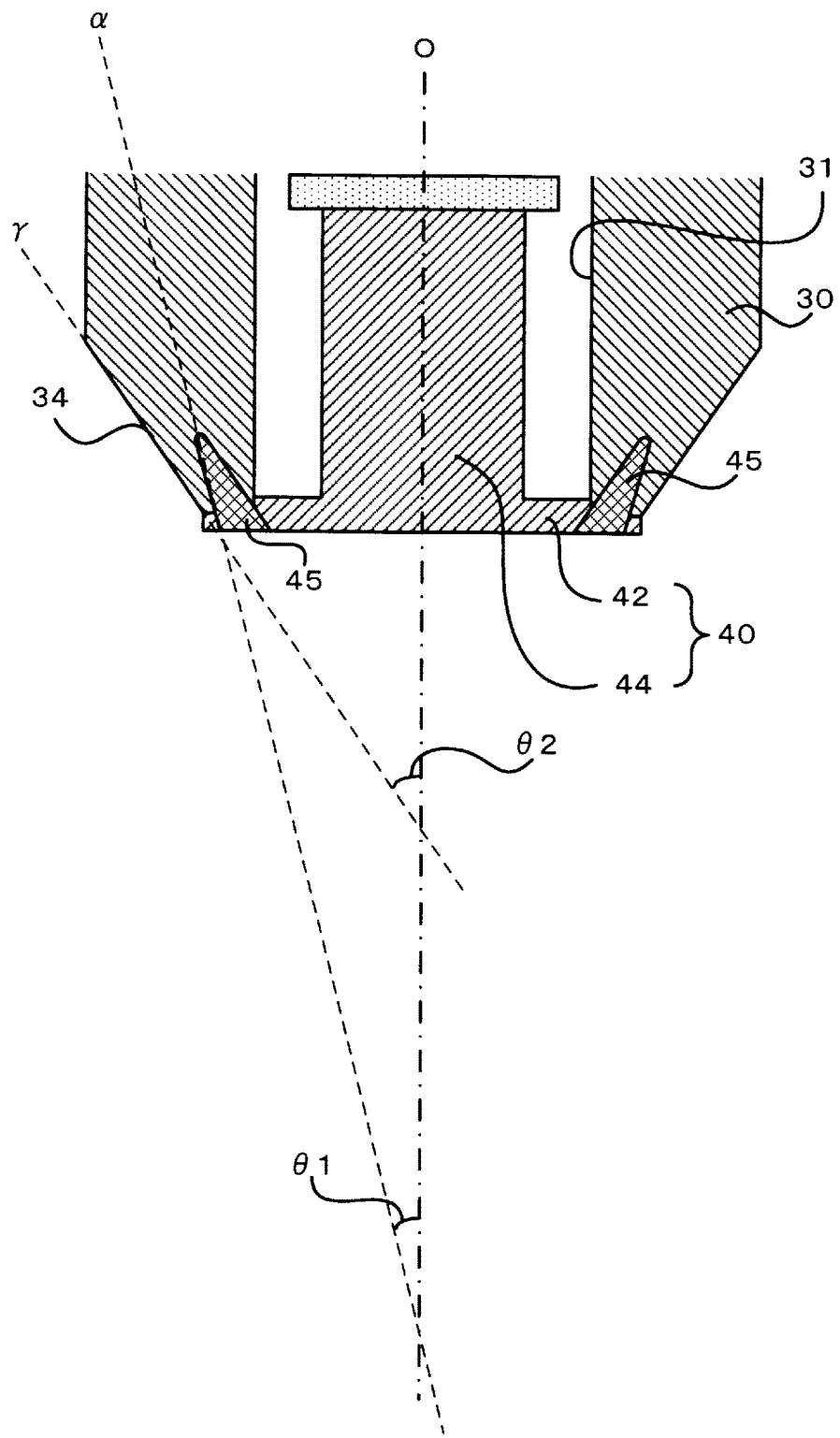
FIG. 6 is a sectional view showing, in an enlarged scale, a forward end portion of the pressure sensor.

FIG. 6 is a sectional view showing, in an enlarged scale, a forward end portion of the pressure sensor 10, the section containing the center axis O. As shown in FIG. 6, the diaphragm 42 is joined to the second metal member 30 through the fusion zone 45. Specifically, the diaphragm 42 is joined to the second metal member 30 by welding, and the fusion zone 45 formed between the diaphragm 42 and the second metal member 30 is where materials of the two members are fused together. In the present embodiment, laser welding is employed. A laser beam for use in the laser welding can be a YAG laser or a carbon dioxide gas laser, and either laser can be employed, so long as the second metal member 30 can be irradiated with a laser beam at a desired angle.

In the present embodiment, the diaphragm 42 and the second metal member 30 are welded in such a manner that a laser beam is radiated rearward from the forward end of the pressure sensor 10 along the entire outer circumference of the diaphragm 42. As a result, the fusion zone 45 is formed annularly; thus, in the section shown in FIG. 6, a pair of the fusion zones 45 appear symmetrically with respect to the center axis O. As for the type of oscillation for laser welding, either pulse laser for intermittently radiating a laser beam or CW laser for continuously radiating a laser beam may be employed, so long as the fusion zone 45 is continuously formed in an annular form, and airtightness in the second metal member 30 is secured.

As shown in FIG. 6, the fusion zone 45 in the present embodiment is formed in such an inclined manner that its distance from the center axis O increases as it extends rearward from the forward side. In FIG. 6, the inclination of the fusion zone 45 is represented by a straight line $\alpha$, and the angle of inclination of the fusion zone 45 is represented by an angle $\theta1$ between the straight line $\alpha$ and the center axis O (an acute angle between the straight line $\alpha$ and the center axis O).

Figure 7:
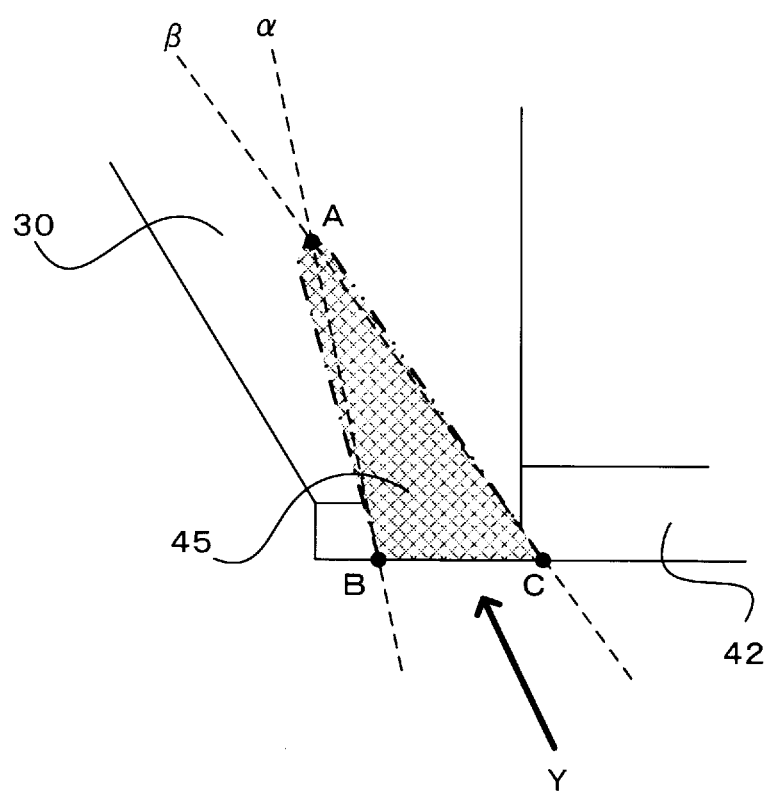
FIG. 7 is an explanatory sectional view showing a straight line α for specifying the inclination of a fusion zone.

FIG. 7 is an explanatory sectional view showing the straight line $\alpha$ for specifying the inclination of the fusion zone 45, the section containing the center axis O as in the case of FIG. 6. Since the fusion zones 45 appearing in the section which contains the center axis O are in line symmetry relation with respect to the center axis O, the following description discusses the fusion zone 45 located on the left side of the center axis O on the paper. In FIG. 7, an end point A of the fusion zone 45 is a point which is located furthest rearward on the perimeter of the fusion zone 45. Also, in FIG. 7, an end point B of the fusion zone 45 is a point which is located farthest from the center axis O on the forward end surface of the pressure sensor 10. Furthermore, in FIG. 7, an end point C of the fusion zone 45 is a point which is located closest to the center axis O on the forward end surface of the pressure sensor 10. As shown in FIG. 7, in the present embodiment, the straight line $\alpha$ which passes through the points A and B specifies the inclination of the fusion zone 45.

In FIG. 7, a straight line $\beta$ is a straight line which passes through the points A and C. Similar to the straight line $\alpha$, the straight line $\beta$ is also inclined in such a manner that its distance from the center axis O increases as it extends rearward from the forward side. Since the point C is shorter in distance from the center axis O than the point B, the straight line $\beta$ is greater in inclination than the straight line $\alpha$. In the present embodiment, among straight lines which approximate the perimeter of the fusion zone 45 on the basis of points on the perimeter of the fusion zone 45, the straight line $\alpha$ whose inclination is the smallest is used for specifying the inclination of the fusion zone 45.

In order to form the thus-inclined fusion zone 45, in welding the diaphragm 42 to the second metal member 30, a laser beam may be radiated in such an inclined manner that its distance from the center axis O increases rearward as it extends rearward from the forward side. In the present embodiment, the entirety of the annular fusion zone 45 is formed at the above-mentioned angle of inclination.

According to the thus-configured pressure sensor 10 of the present embodiment, even when the joint between the second metal member 30 and the diaphragm 42 is damaged due to thermal history or the like in the course of repeated use of the pressure sensor 10; specifically, due to repetition of thermal expansion caused by temperature rise and contraction caused by cooling, or the like, detachment of component members of the pressure sensor 10 can be restrained. The component members of the pressure sensor 10 are those including the diaphragm 42; specifically, for example, the pressure receiver 40 and the element assembly 50.

In the pressure sensor 10 of the present embodiment, the diaphragm 42 is disposed at the forwardmost position along the center axis O. Thus, when the members including the diaphragm 42 are detached from the pressure sensor 10, the detached members are caught by any other structural feature of the pressure sensor 10 and may not possibly drop into object equipment of pressure measurement. When the above-mentioned component members of the pressure sensor 10 are detached, the pressure sensor 10 fails to function; furthermore, if the detached members were to drop into a combustion chamber (cylinder) of an internal combustion engine, they could possibly damage the internal combustion engine. According to the pressure sensor 10 of the present embodiment, even when the pressure sensor 10 is damaged due to deterioration stemming from thermal history or the like, propagation of damage to an object equipment of pressure measurement can be restrained.

Since the fusion zone 45 is formed through fusion of base metals; i.e., metal members to be welded (second metal member 30 and diaphragm 42), the fusion zone 45 differs from the base metals in composition and microstructure. As a result, a difference in thermal expansion coefficient arises between the fusion zone 45 and the base metals; thus, a crack is apt to be generated in the perimeter of the fusion zone 45 due to the difference in thermal expansion coefficient. Damage to a joint between the second metal member 30 and the diaphragm 42 caused by repetition of thermal expansion and contraction is usually the generation of a crack in the perimeter of the fusion zone 45. The perimeter of the fusion zone 45 is represented in FIG. 7 by a dashed-dotted line AB and a dashed-two dotted line AC. That is, a crack could be generated in at least a portion of at least one of the dashed-dotted line AB and the dashed-two dotted line AC.

As mentioned previously, in the present embodiment, the straight line α, which passes through the points A and B, is inclined in such a manner that its distance from the center axis O increases as it extends rearward from the forward side. Thus, even though a crack is generated along the dashed-dotted line AB and along the entire circumference of the fusion zone 45, the members including the diaphragm 42 are supported by wall metal of the second metal member 30 corresponding to the crack, whereby a forward detachment of the members from the pressure sensor 10 is prevented. Also, in the case where a crack is generated along the dashed-two dotted line AC, as is understood from the fact that the inclination of the straight line β is greater than that of the straight line α, a force with which the second metal member 30 supports the members including the diaphragm 42 becomes greater, whereby the detachment of the members including the diaphragm 42 can be prevented. Thus, according to the present embodiment, even though a crack is generated at any position on the perimeter of the fusion zone 45, the detachment of the members including the diaphragm 42 can be restrained.

Figure 8:
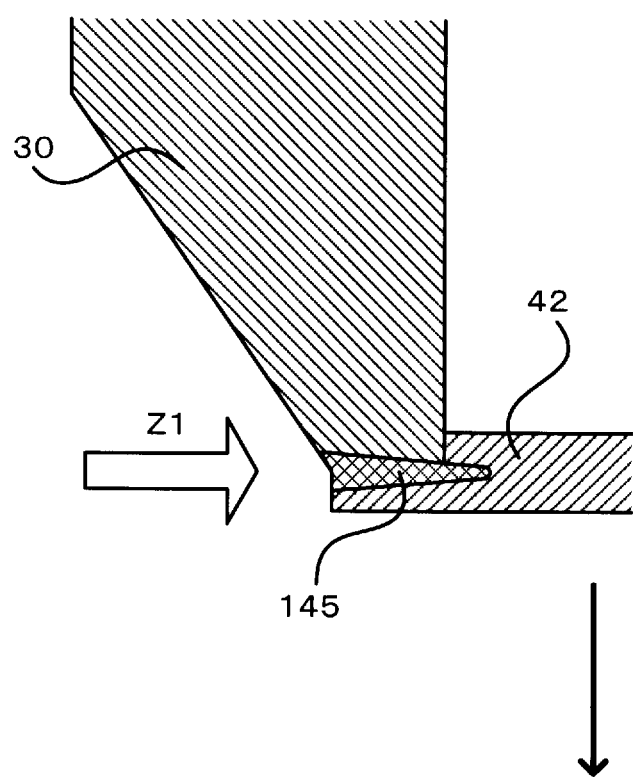
FIG. 8 is an explanatory view showing the provision of a fusion zone along a contact surface between a diaphragm and the second metal member.

FIG. 8 is an explanatory view showing the provision of a fusion zone 145 along a contact surface between the diaphragm 42 and the forward end of the second metal member 30 different from the provision of the fusion zone 45 in the first embodiment. Specifically, FIG. 8 shows a state in which a laser beam is radiated for welding from a direction perpendicular to the center axis O; specifically, from a direction indicated by an arrow Z1. Thus, the fusion zone 145 is formed in such a manner as to extend toward the center axis from the outer circumferential surface of the pressure sensor. The provision of the fusion zone 145 in such a form can enhance welding strength, but involves the following problem: when a crack is generated along the circumference of the fusion zone 145, since the wall surface of the second metal member 30 cannot support members including the diaphragm 42, the members including the diaphragm 42 may possibly be detached. In FIG. 8, the solid arrow indicates a direction in which the members including the diaphragm 42 are detached.

In view of the provision of the aforementioned effect of restraining the detachment of the members including the diaphragm 42, the angle θ1 between the center axis O and the straight line α indicative of the inclination of the fusion zone 45 is desirably 0.5° or more. If the fusion zone 45 is inclined in the aforementioned direction, even at an angle θ1 of less than 0.5°, there can be provided the effect of restraining the detachment of the members including the diaphragm 42; however, in order to enhance the effect, a greater angle θ1 is desired.

Meanwhile, the angle θ1 indicative of the inclination of the fusion zone 45 can be equal to or greater than an angle θ2 described below, but is desirably smaller than the angle θ2. As mentioned previously, the second metal member 30 of the pressure sensor 10 has the diameter-expanding portion 34 provided at a forward end portion thereof for establishing airtight contact with the cylinder head of the internal combustion engine. In the sectional view of FIG. 6, a straight line γ extends along the surface of the diameter-expanding portion 34. The angle θ2 is the angle of inclination of the diameter-expanding portion 34 and is formed between the straight line γ and the center axis O (an acute angle between the straight line γ and the center axis O).

In the pressure sensor 10, the distance between the fusion zone 45 and the surface of the diameter-expanding portion 34 is desirably long. This is for the following reason: in the case where the fusion zone 45 is formed near the surface of the diameter-expanding portion 34, in providing the fusion zone 45 by laser radiation, the surface of the diameter-expanding portion 34 may be affected by heat and distorted in some cases, and the distortion of the surface of the diameter-expanding portion 34 may possibly damage a seal between the pressure sensor 10 and the cylinder head. By means of the fusion zone 45 being provided such that the angle θ1 becomes smaller than the angle θ2, a sufficient distance can be easily secured between the fusion zone 45 and the surface of the diameter-expanding portion 34; thus, there can be restrained the distortion of the surface of the diameter-expanding portion 34 caused by heat in welding. Also, by means of the fusion zone 45 being provided such that the angle θ1 becomes smaller than the angle θ2, even when the fusion zone 45 is provided deeper, a sufficient distance can be secured between the fusion zone 45 and the surface of the diameter-expanding portion 34; thus, welding strength can be enhanced.

C. Second Embodiment

Figure 9:
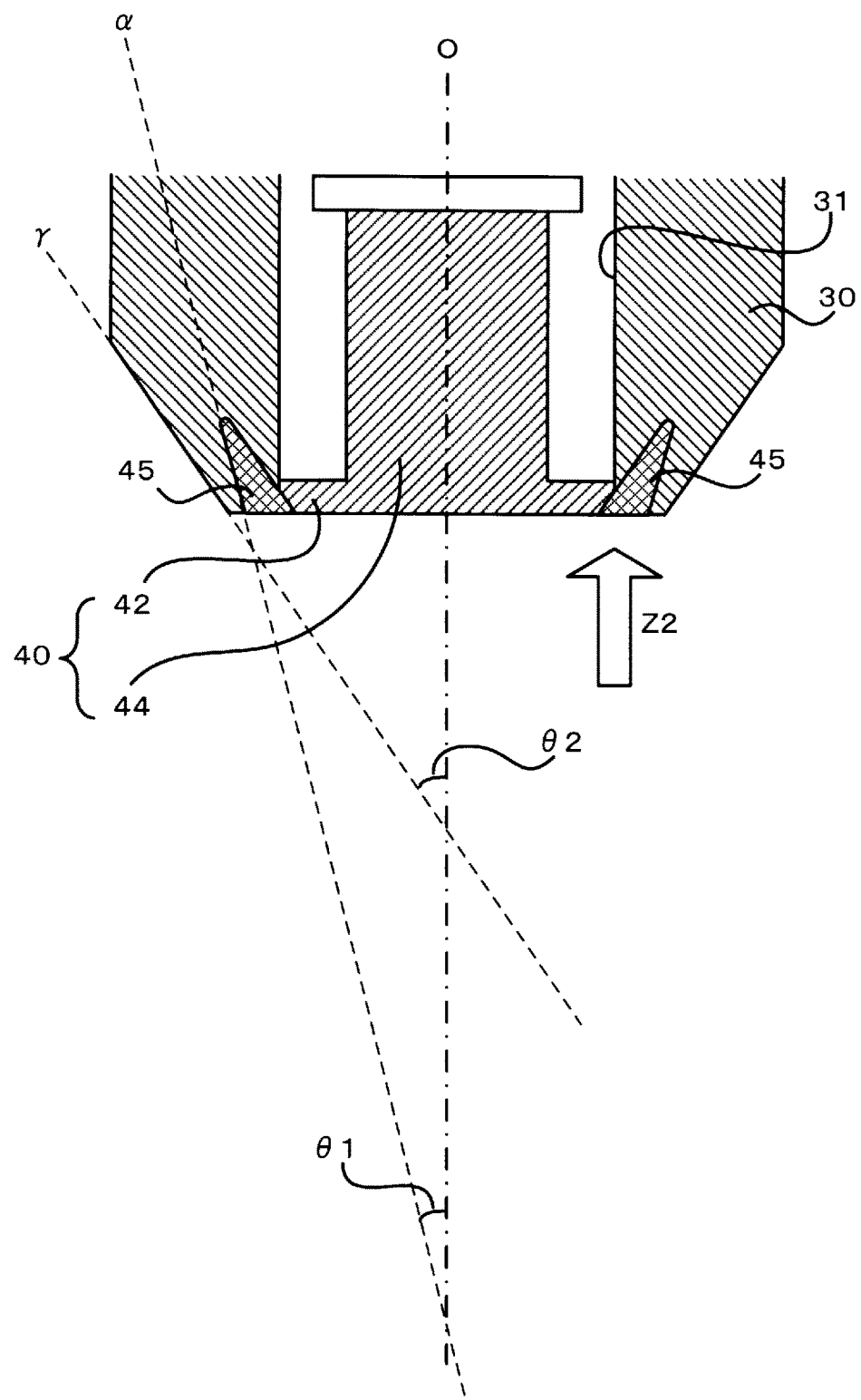
FIG. 9 is a schematic sectional view showing a forward end portion of a pressure sensor of a second embodiment of the present invention.

FIG. 9 is a schematic sectional view showing a forward end portion of a pressure sensor of a second embodiment of the present invention. Since the pressure sensor of the second embodiment is similar to that of the first embodiment except for the structure of the forward end, common members are denoted by the same reference numerals, and detailed description thereof is omitted.

In the above-described first embodiment, the diaphragm 42 is disposed such that the rear end surface thereof is in contact with the forward end surface of the second metal member 30. By contrast, in the pressure sensor of the second embodiment, the diaphragm 42 is disposed such that the side surface in parallel with the thickness direction of the diaphragm 42 is in contact with the wall surface of the axial hole 31 of the second metal member 30. Even in such a case, by means of the diaphragm 42 and the second metal member 30 being joined through the fusion zone 45 in a form similar to that of the first embodiment, an effect similar to that of the first embodiment can be yielded.

In FIG. 9, for the purpose of contrast to the second embodiment, an arrow Z2 imaginarily shows the position and direction of laser radiation in the case of providing the fusion zone along a contact surface between the second metal member 30 and the diaphragm 42. Even in such a case of providing the fusion zone by laser radiation in a direction parallel to the center axis O, welding strength between the second metal member 30 and the diaphragm 42 can be enhanced. However, when a crack is generated along the outer circumference of the fusion zone, since the wall surface of the second metal member 30 can not support the members including the diaphragm 42, the members including the diaphragm 42 may possibly be detached. By contrast, according to the second embodiment, the axis of radiation of a laser beam in welding is inclined, different from the arrow Z2, in such a manner its distance from the center axis O increases as it extends rearward from the forward side. Thus, not only can welding strength between the diaphragm 42 and the second metal member 30 be secured, but also detachment of the members including the diaphragm 42 can be restrained even when a crack is generated along the outer circumference of the fusion zone 45.

D. Modifications (1) In the above-described embodiments, the fusion zone 45 is formed by laser welding; however, other welding methods, such as arc welding and electron beam welding, may be employed. No particular limitation is imposed on a welding method, so long as the fusion zone 45 can be formed at a predetermined angle; i.e., if the fusion zone 45 is formed in such an inclined manner that its distance from the center axis O increases as it extends rearward from the outer surface of the diaphragm 42, an effect similar to that of the embodiments can be yielded.

(2) The above-described embodiments employ, as a sensor element to which pressure received by the diaphragm 42 is transmitted, the piezoelectric element 51 to which the amount of deformation of the diaphragm is transmitted in the form of load and which converts the transmitted load into an electric charge; however, a different element may be employed. For example, a semiconductor-type strain gauge or the like may be employed as the sensor element.

(3) In the above-described embodiments, the pressure sensor 10 has the diameter-expanding portion 34 formed at a forward end portion thereof, and the diameter-expanding portion 34 is in airtight contact with the cylinder head of the internal combustion engine; however, a different structure may be employed. The diameter-expanding portion may not be provided at a forward end portion of the pressure sensor, and a portion for airtight contact with the cylinder head may be provided at a position located rearward of the diameter-expanding portion 34 of the embodiments; for example, at the first metal member 20.

(4) In the above-described embodiments, the pressure sensor 10 is used for detecting the combustion pressure of the internal combustion engine, but may be used for other purposes. For example, the pressure sensor 10 can be used as an air pressure gauge for equipment other than the internal combustion engine.

The present invention is not limited to the above-described embodiments and modifications, but may be embodied in various other forms without departing from the spirit of the invention. For example, in order to solve, partially or entirely, the above-mentioned problem or yield, partially or entirely, the above-mentioned effects, technical features of the embodiments and modifications corresponding to technical features of the modes described in the section "Summary of the Invention" can be replaced or combined as appropriate. Also, the technical feature(s) may be eliminated as appropriate unless the present specification mentions that the technical feature(s) is mandatory.

DESCRIPTION OF REFERENCE NUMERALS

10: pressure sensor
20: first metal member
21: axial hole
22: threaded portion
24: tool engagement portion
26: fusion zone
30: second metal member
31: axial hole
32: pressing screw
34: diameter-expanding portion
36: axial hole
37: external thread portion
38: internal thread portion
40: pressure receiver
42: diaphragm
44: rod
45: fusion zone
50: element assembly
51: piezoelectric element
52: first packing
53: electrode plate
54: second packing
55: insulation plate
56: terminal portion
57: disk portion
60: cable
61: jacket
62: outer conductor
63: electrically conductive coating
64: insulator
65: inner conductor
72: heat-shrinkable tube
74: small-diameter conductor
75: flat conductor
76: grounding conductor
145: fusion zone

What is claimed is:

1. A pressure sensor comprising:
a tubular housing having a forward portion and a rear side;
a diaphragm joined to the forward portion of the housing through a fusion zone; and
a sensor element disposed in the housing and to which pressure received by the diaphragm is transmitted,
wherein as viewed in a section which contains a center axis of the housing, the fusion zone has a pair of cross-sectional portions, each of the cross-sectional portions formed in an inclined manner such that a distance from the center axis to a respective cross-sectional portion increases as the cross-sectional portion extends from an outer surface of the diaphragm toward the rear side of the housing.

2. The pressure sensor according to claim 1, wherein as viewed in the section which contains the center axis of the housing, for each of the pair of cross-sectional portions a first angle is defined between the center axis of the housing and a straight line which passes through a first end point of the cross-sectional portion located nearest to the rear side and through a second end point of the cross-sectional portion located farthest from the center axis of the housing on an end surface of the pressure sensor on a forward side of the housing, the first angle being 0.5 degrees or more.

3. A pressure sensor according to claim 2, wherein
the housing has a diameter-expanding portion formed at the forward portion, the diameter-expanding portion having a diameter that expands as the housing extends toward the rear side from the forward portion and the diameter-expanding portion configured for airtight contact with an object body for attachment, and as viewed in the section which contains the center axis of the housing, a second angle is defined between the center axis of the housing and a straight line extending along a surface of the diameter-expanding portion, the second angle larger than the first angle.

\* \* \* \* \*